(No Model.)
S. H. FLAGG.
CONDUIT FOR ELECTRIC RAILWAYS.
No. 504,676. Patented Sept. 5, 1893.
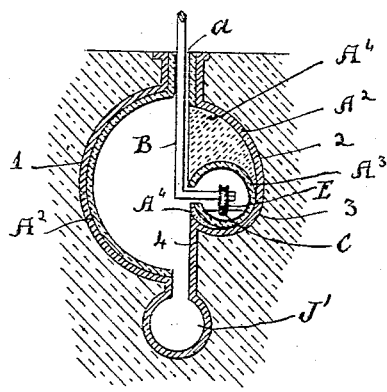
Witnesses.
Inventor.
Samuel H. Flagg.
by Edwin Planta.
Attorney.

UNITED STATES PATENT OFFICE.

SAMUEL H. FLAGG, OF PROVIDENCE, RHODE ISLAND.

CONDUIT FOR ELECTRIC RAILWAYS.

SPECIFICATION forming part of Letters Patent No. 504,676, dated September 5, 1893.

Application filed August 24, 1892. Serial No. 443,942. (No model.)

*To all whom it may concern:*

Be it known that I, SAMUEL H. FLAGG, a citizen of the United States, residing at Providence, in the county of Providence and State of Rhode Island, have invented certain new and useful Improvements in Conduits for Electric Railways, of which the following is a specification.

My invention relates to conduits for containing positive electric wires for transmitting electricity to cars without the loss of electricity by induction.

The invention consists of a conduit consisting of a large pipe of metal having a slot in its upper side, said pipe containing a pipe of cast glass also slotted, and arranged on one side as hereinafter fully described and pointed out in the claims embodying my invention.

The accompanying drawing is a cross section of the conduit.

$A^2$, represents an outer iron pipe or casing forming the conduit which is at its upper end formed with a slot $a$, through which the contact bar B, passes. This casing is of about the form shown, that is of semicircular form on one side to form a shoulder or shelf 1, with a drain J', at the bottom, and a semicircular recess 2, on the opposite side, rounding at the bottom 3, to the side 4, so as to form an aperture on one side of the conduit in which is arranged a cast glass pipe or casing $A^3$, having a longitudinal slot or opening on its inner side and arranged to carry the positive electric wire C, the space around the glass casing $A^3$, being filled in with cement $A^4$, so as to retain said casing in the proper position and protect the said cast glass pipe $A^3$. A wheel E, travels upon the wire C, to communicate the current to the contact bar B, which is bent at right angles so as to enter the longitudinal slot in the glass casing. The under side of the portion 1, and the upper portion of the conduit is also covered or cased with glass plates to secure more beneficial results. The electric current is thus conducted from the wire C, through the wheel E and bar B, to the connection to the motor.

What I claim is—

1. In a conduit for electric railways having a slot for the contact bar to pass through, and a shoulder or shelf at one side a cast glass tube, having a longitudinal slot on its inner side, and arranged on one side of said contact bar slot, said cast glass tube being embedded in cement substantially as set forth.

2. In an electric railway, a conduit consisting of an outer metal tube or pipe having a shelf at one side, the bottom of which is rounding a glass tube or pipe arranged on said shelf said glass pipe being set in cement, an electric wire supported therein, in combination with a contact bar having a roller to run upon said wire, and its upper end connected to the motor on the car substantially as shown and described.

3. A conduit for electric railways consisting of a metal casing having a lining of glass, and a drain at the bottom a small cast glass pipe arranged on one side thereof and having a longitudinal slot on its inner side, said cast glass pipe being embedded in cement substantially as set forth.

In testimony whereof I have signed my name to this specification, in the presence of two subscribing witnesses, on this 16th day of August, A. D. 1892.

SAMUEL H. FLAGG.

Witnesses:
J. E. HANLY,
EDWIN PLANTA.